United States Patent
Tatebayashi et al.

(10) Patent No.: US 8,212,523 B2
(45) Date of Patent: Jul. 3, 2012

(54) PROTECTION DEVICE FOR ASSEMBLED CELL PROVIDING EQUAL CONSUMPTION CURRENT FOR EACH BATTERY MODULE, AND BATTERY PACK UNIT

(75) Inventors: Yoshinao Tatebayashi, Yokohama (JP); Yasuhiro Harada, Yokohama (JP); Norio Takami, Yokohama (JP); Nobuo Shibuya, Hiratsuka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 171 days.

(21) Appl. No.: 12/050,595

(22) Filed: Mar. 18, 2008

(65) Prior Publication Data

US 2009/0224725 A1    Sep. 10, 2009

(30) Foreign Application Priority Data

Mar. 28, 2007  (JP) ................................. 2007-086021

(51) Int. Cl.
*H02J 7/00* (2006.01)
(52) U.S. Cl. ........................................ 320/118; 320/116
(58) Field of Classification Search .................. 320/134, 320/136, 152, 157, 162, 116, 118
See application file for complete search history.

(56) References Cited

U.S. PATENT DOCUMENTS

| | | | | |
|---|---|---|---|---|
| 5,493,197 A | * | 2/1996 | Eguchi et al. | 320/116 |
| 5,825,155 A | * | 10/1998 | Ito et al. | 320/118 |
| 5,982,145 A | * | 11/1999 | Eguchi | 320/128 |
| 5,998,967 A | * | 12/1999 | Umeki et al. | 320/122 |
| 6,121,752 A | * | 9/2000 | Kitahara et al. | 320/122 |
| 7,489,106 B1 | * | 2/2009 | Tikhonov | 320/116 |
| 2009/0167244 A1 | * | 7/2009 | Kurose et al. | 320/122 |
| 2009/0195213 A1 | * | 8/2009 | Li et al. | 320/136 |
| 2009/0315514 A1 | * | 12/2009 | Lee et al. | 320/116 |

FOREIGN PATENT DOCUMENTS

| | | | |
|---|---|---|---|
| EP | 1460744 A2 | * | 9/2004 |
| JP | 06253463 A | * | 9/1994 |
| JP | 2004-282960 | | 10/2004 |
| WO | WO 2008007924 A1 | * | 1/2008 |

* cited by examiner

*Primary Examiner* — Edward Tso
*Assistant Examiner* — Manuel Hernandez
(74) *Attorney, Agent, or Firm* — Oblon, Spivak, McClelland, Maier & Neustadt, L.L.P.

(57) ABSTRACT

A protection device for an assembled cell including battery modules connected in series includes protection units each of which is configured to operate using a corresponding battery module as a power supply and a management unit connected to the protection units in common, the protection unit includes a measuring unit configured to measure its own consumption current to obtain measurement data, a communication unit which transmits the measurement data to a management unit and receives setting data from the management unit, a discharging unit which discharges the corresponding battery module, and a control unit configured to control the discharging unit based on the measurement data and the setting data so that a total of the consumption current and a discharging current by the discharging unit is of a constant value among the protection units.

11 Claims, 5 Drawing Sheets

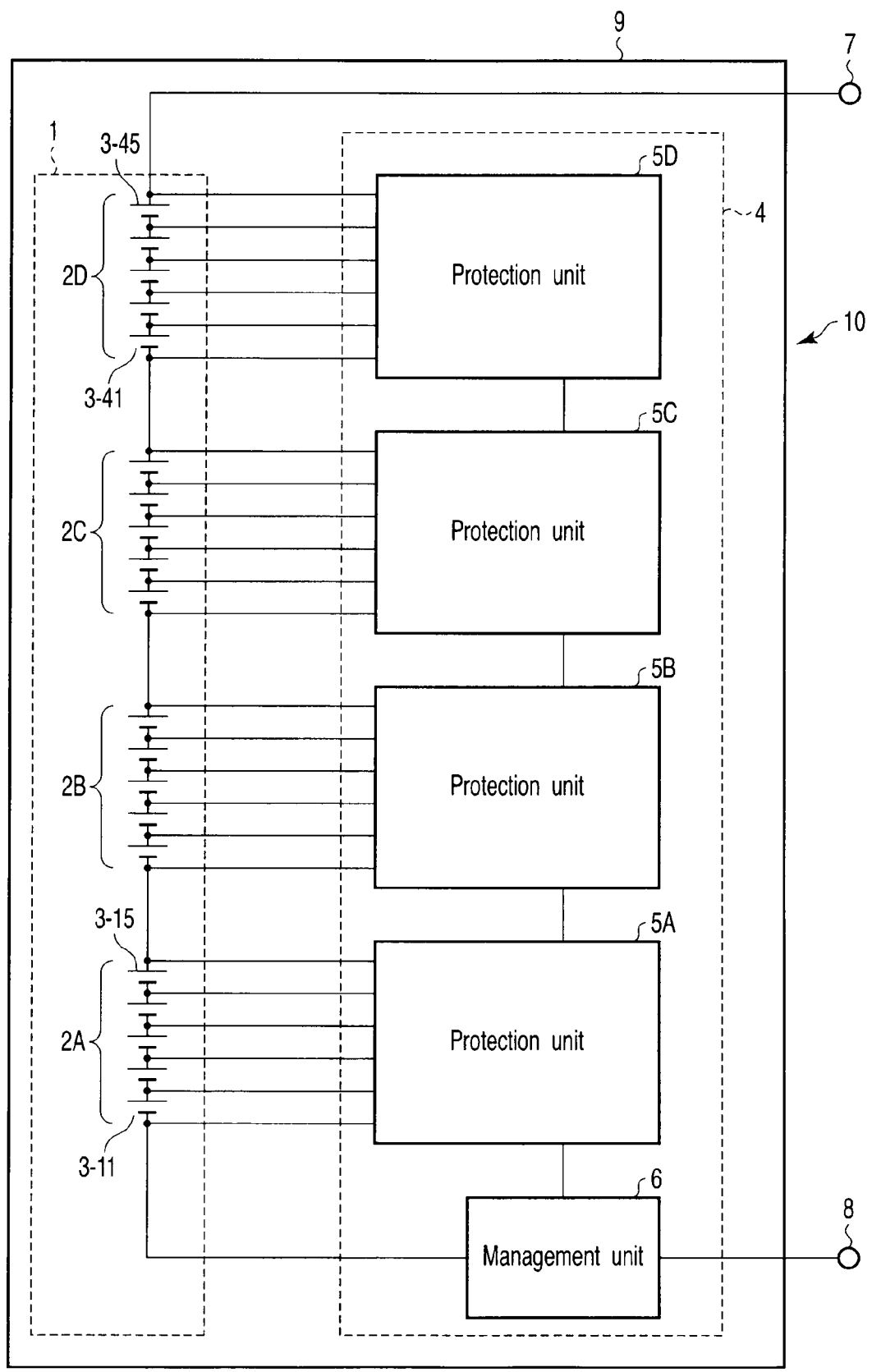
F I G. 1

PROTECTION DEVICE FOR ASSEMBLED CELL PROVIDING EQUAL CONSUMPTION CURRENT FOR EACH BATTERY MODULE, AND BATTERY PACK UNIT

CROSS-REFERENCE TO RELATED APPLICATIONS

This application is based upon and claims the benefit of priority from prior Japanese Patent Application No. 2007-086021, filed Mar. 28, 2007, the entire contents of which are incorporated herein by reference.

BACKGROUND OF THE INVENTION

1. Field of the Invention

The present invention relates to a protection device for protecting an assembled cell including a plurality of secondary batteries connected in series, and a battery pack unit incorporating a protection device.

2. Description of the Related Art

A high energy density secondary battery has been widely used as a power supply for small information equipment such as a portable phone and a notebook personal computer. The secondary batteries are often connected in series, the number of which corresponds to a voltage and current necessary for an objective apparatus or often used as an assembled cell in which they are connected in series or in parallel. Because a power supply voltage of the aforementioned small information equipment is about several V to 10 V, the number of series connections in the assembled cell is 1 to 3.

On the other hand, in recent years, application of the secondary battery to purposes requiring a high output and high voltage such as household electric appliances, power tools, assisted bicycles and hybrid electric vehicles has been expanding rapidly as well as the power supply for the information equipment. Accompanied by this, the number of series connections in the assembled cell is increased, and it is not rare that 10 or more batteries are connected in series.

A prominent problem in connecting the batteries in series is a fluctuation between individual batteries (called cells). The fluctuation includes, for example, fluctuation in capacity, fluctuation in impedance, and fluctuation in the state of charge (SOC). A fluctuation which likely leads to an error of these ones is a fluctuation in voltage which is one of the fluctuations in the SOC.

If batteries having different capacities are connected in series or a plurality of batteries are connected under different SOCs, a cell having a higher voltage or a cell having a lower voltage than the average is generated in a fully charged state of the assembled cell. The cell having a higher voltage is turned into an overcharged state, whereby deterioration is intensified. If the charge is repeated, the cell whose deterioration is intensified by the overcharge has a reduced capacity, so that the overcharge is progressed, thereby accelerating the deterioration. As a result, the cycle service life of the assembled battery is shortened extremely than the service life of the cell.

The cause for the fluctuation in the SOC includes not only the fluctuation of the cell in an initial period but also a factor generated during use of the assembled battery. For example, sometime there is a difference in temperature among the cells or currents discharged from each cell are different, thereby leading to a cause for the fluctuation in the SOC. Particularly, because the protection device is complicated in the assembled cell which has many series connections to output a high voltage, the discharge current by the protection device is apt to fluctuate.

In the assembled cell composed of a large number of batteries connected in series with a high voltage output, the protection device is generally constituted of protection units provided for each battery module each having several cells to ten and several cells for the reason of restriction about withstand voltage of an integrated circuit (IC) for use in the protection device. Each protection unit is operated using a battery module as a power supply, measures the voltages of each cells and temperature in a corresponding battery module and communicates with protection units on the upper level and lower level in order to monitor the entire system.

On the other hand, JP-A 2004-282960 (KOKAI) has disclosed a technique for correcting a fluctuation in voltage due to a difference in consumption current among blocks if an assembled cell is divided to a plurality of blocks along a voltage detecting line by an incoming current of the voltage detecting line. More specifically, a circuit or element calculated preliminarily so that consumption currents of other blocks are matched with a consumption current of the block having a maximum current value in the blocks of the assembled cell is inserted in between a cathode and an anode of the other blocks so as to correct the fluctuation in the voltage.

In the manner provided with the protection units for each module of the assembled cell, a difference in consumption current of the protection unit itself is generated due to a fluctuation of an electric circuit in the protection unit or a fluctuation in communication data amount. If there is a difference in consumption current among the protection units, a fluctuation in the SOC occurs among the modules, which is a problem to be solved.

On the other hand, although the technique of JP-A 2004-282960 (KOKAI) can correct the fluctuation in the voltage among the blocks in the assembled cell due to the incoming current for voltage detection, still the SOC fluctuation occurs because a difference in consumption current among the units due to the operation of the protection unit itself is not considered.

BRIEF SUMMARY OF THE INVENTION

An object of the present invention is to provide a protection device for an assembled cell, which enables the service life of the assembled cell to be extended while suppressing a fluctuation in the state of charge among cells due to the difference in consumption current among the protection units, and a battery pack unit.

According to one aspect of the present invention, there is provided protection device for an assembled cell including a plurality of battery modules connected in series, each of which includes a plurality of secondary batteries connected in series, the protection device comprises: a plurality of protection units provided corresponding to the battery modules, each of which is configured to operate as a power supply for a corresponding battery module; and a management unit connected to the protection units in common, wherein each protection unit includes: a measuring unit configured to measure its own consumption current to obtain measurement data; a communication unit which transmits the measurement data to the management unit and receives setting data from the management unit; a discharging unit which discharges the corresponding battery module; and a control unit configured to control the discharging unit based on the measurement data and the setting data so that a total of the consumption current and a discharging current by the discharging unit is of a constant value among the protection units.

BRIEF DESCRIPTION OF THE SEVERAL VIEWS OF THE DRAWING

FIG. 1 is a block diagram schematically showing a protection device for an assembled cell according to a first embodiment and a battery pack unit incorporating the protection device;

DETAILED DESCRIPTION OF THE INVENTION

Figure 2:
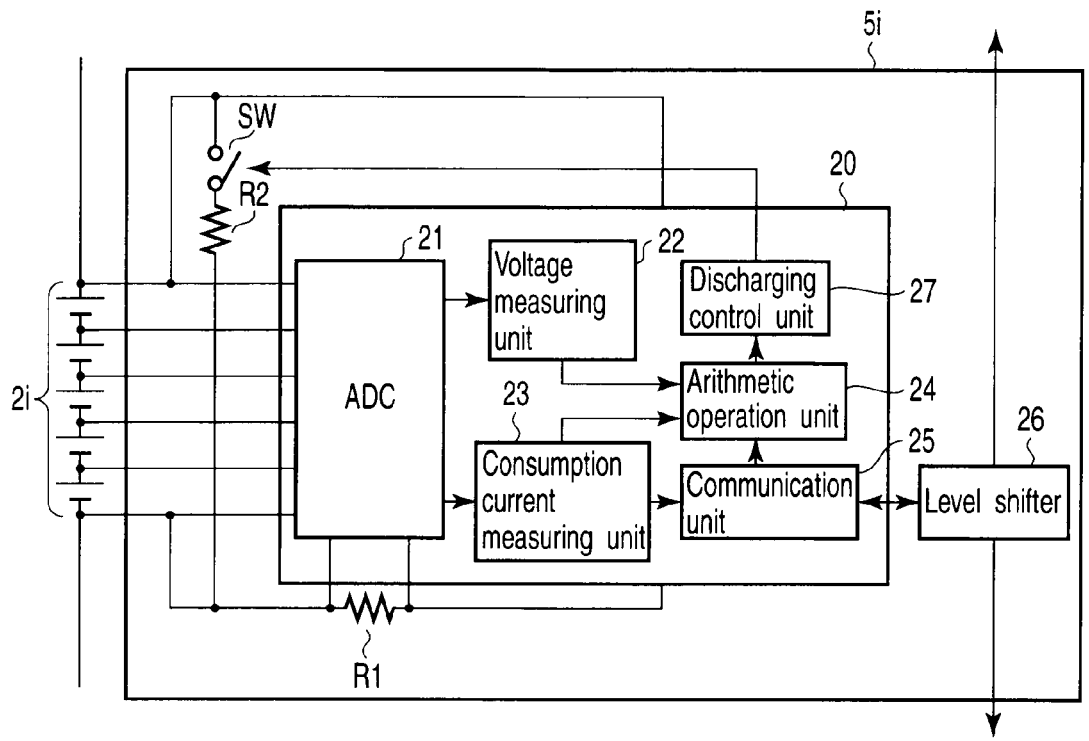
FIG. 2 is a block diagram showing an example of a protection unit in FIG. 1.

Hereinafter, one embodiment of the present invention will be described with reference to the accompanying drawings.

As shown in FIG. 1, a protection device according to the embodiment of the invention is applied to an assembled cell 1 constituted of a plurality of battery modules 2A to 2D connected in series, each including a plurality of secondary batteries 3-nm (n=1 to 4, m=1 to 5 in the example of FIG. 1) connected in series. One end of the assembled cell 1 is connected to an external connecting terminal 7 and the other end thereof is connected to an external terminal 8 through a management unit 6. Hereinafter, each of the secondary batteries 3-nm is called cell.

The protection device 4 includes protection units 5A to 5D connected respectively to the battery modules 2A to 2D and the management unit 6 common to the battery modules 2A to 2D. Although the protection device 4 may be accommodated in a different casing from the assembled cell 1, it may be in some cases accommodated in a casing 9 together with the assembled cell 1 and used as a battery pack unit 10 together with the assembled cell 1.

FIG. 2 shows one 5i (i=A, B, C, D) of the protection units 5A to 5D.

Basically, the protection units 5A to 5D have a function of executing a charge prohibiting operation when a voltage (hereinafter referred to as cell voltage) of each cell of the battery modules 2A to 2D reaches a charge prohibiting voltage and of executing a discharge prohibiting operation when the cell voltage reaches a discharge prohibiting voltage when discharged. Description of the basic function is omitted here.

As shown in FIG. 2, the protection unit 5i is connected to a corresponding battery module (hereinafter referred to as corresponding battery module) 2i (i=A, B, C, D) and operated using the corresponding battery module 2i as a power supply. The protection unit 5i is configured to mainly a microcontroller 20. A power is supplied to the microcontroller 20 and a level shifter 26 from the corresponding battery module 2i through a current detection resistor R1 which is an external element. Further, a discharging switch SW and a discharging resistor R2 are connected to the corresponding battery module 2i.

The microcontroller 20 includes an analog-to-digital converter (ADC) 21, a voltage measuring unit 22, a consumption current measuring unit 23, an arithmetic operation unit 24, a communication unit 25 and a discharging control unit 27. The ADC 11 converts each cell voltage of the battery module 2i into a digital value, and the voltages are measured by the voltage measuring unit 22 based on the digital value. Further, the ADC 11 converts a voltage drop of a current detecting resistor R1 into a digital value. Based on the digital value, a consumption current (substantially, consumption current of the microcontroller 20) of the protection unit 5i is measured by the consumption current measuring unit 23. Based on the digital value, a consumption current (substantially, consumption current of the microcontroller 20) of the protection unit 5i is measured by the consumption current measuring unit 23.

Voltage measurement data obtained from the voltage measuring unit 22 is given to the communication unit 25 through the arithmetic operation unit 24 or directly. Current measurement data obtained by the consumption current measuring unit 23 is given to the arithmetic operation unit 24 and the communication unit 25. The arithmetic operation unit 24 obtains a discharging current or discharging electric quantity of the corresponding battery module 2i necessary for correction of the SOC fluctuation from the current measurement data obtained by the consumption current measuring unit 23 and the setting data concerning current or electric quantity sent from the management unit 6 through the communication unit 25.

The communication unit 25 is connected to other protection units on the upper level and lower level through the level shifter 26 so as to exchange data with the other protection units. Here, of the protection units 5A to 5D, the units nearer the management unit 6 are regarded to be of lower level. In this case, the protection unit 5A on the highest level is connected to only the protection unit 5B just on a lower level, and the protection unit 5D on the lowest level is connected to the protection units 5C just on a higher level and the management unit 6.

Specifically, the communication unit 25 transmits the current measurement data from the consumption current measuring unit 23 to the management unit 6 through a lower level protection unit and receives the setting data sent from the management unit 6, more specifically, the setting data concerning the consumption current or discharging current of the protection units 5A to 5D or discharging electric quantity through a lower protection unit.

Reference potentials of the circuit in protection units 5A to 5D are different because the protection units 5A to 5D use the battery modules 2A to 2D connected in series of the assembled cell 1, respectively, as a power supply. That is, a higher level protection unit has a higher reference potential. The level shifter 26 takes a role of arranging reference potentials for a communication signal in order to enable the protection units 5A to 5D to communicate with each other or with the management unit 6 regardless of the difference in reference potential.

The discharging control unit 27 controls the discharging switch SW based on an instruction from the arithmetic operation unit 24 to discharge the battery module 2i. As the discharging switch SW, for example, a field effect transistor (FET) or bipolar transistor is used. The discharging control unit 27 controls on-time or on-interval of the FET or bipolar transistor under control of, for example, pulse width modulation (PWM), or controls on-resistance of the transistor so as to discharge the discharging switch SW with a controlled discharging current.

The discharging switch SW is controlled by the discharging control unit 27 so as to discharge a corresponding battery module by changing the magnitude of the discharging current or the discharging time in accordance with, for example, a consumption current setting value given from the management unit 6 as setting data and a value of a consumption current measured by the consumption current measuring unit 23.

Figure 3:
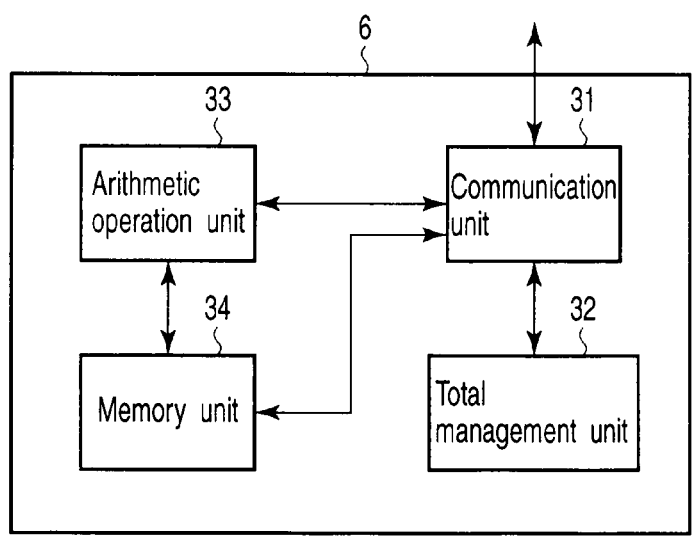
FIG. 3 is a block diagram showing an example of a management unit in FIG. 1.

The management unit 6 is realized using a microcontroller and configured to include a communication unit 31, a total management unit 32, an arithmetic operation unit 33 and a memory unit 34 as shown in FIG. 3. The communication unit 31 is provided to exchange data among the protection units 5A to 5D. The total management unit 32 controls entirely the protection units 5A to 5D through the communication unit 31. More specifically, the total management unit 32 controls charging and discharging of the entire assembled cell 1 in accordance with a cell voltage, etc. based on the voltage measurement data received through the communication unit 31.

The arithmetic operation unit 33 computes to obtain setting data concerning the current or electric quantity for mainly the protection units 5A to 5D. That is, the arithmetic operation unit 33 obtains the setting data about the discharging current or discharging electric quantity for the protection units 5A to 5D in accordance with a consumption current obtained by the consumption current measuring unit 23. The setting data obtained in this way is supplied to the protection units 5A to 5D through the communication unit 31. The memory unit 34 is provided to store data necessary for arithmetic operation of the arithmetic operation unit 33.

In the assembled cell 1 with a high voltage output including many series connections like this embodiment, the protection device 4 is constituted of the protection units 5A to 5D provided each at the battery modules 2A to 2D each including several cells to ten and several cells as shown in FIG. 1 from the reason of restriction of the withstand voltage of the IC for use in the protection device 4.

The respective protection units 5A to 5D measure the cell voltage and temperature of the corresponding battery modules 2A to 2D so as to control discharging of a corresponding battery module following a result of the measurement and results of measurement of other protection units. Further, the protection units 5A to 5D are operated using the corresponding battery modules 2A to 2D as power supplies, respectively, and communicate with protection units on the upper level or lower level in order to monitor the entire system.

Under such a configuration, a difference is generated in each consumption current due to a fluctuation in electric circuit of the protection units 5A to 5D and a fluctuation in communication data amount. To solve such a problem, the protection units 5A to 5D of this embodiment are equipped with a consumption current measuring unit 23 for measuring its own consumption current and a discharge unit (switch SW and discharging control unit 27) capable of discharging each of the battery modules 2A to 2D. Consequently, the consumption currents of the protection units 5A to 5D can be arranged to a constant level so as to suppress the fluctuation in the SOC among the battery modules 2A to 2D.

In the field of a hybrid electric vehicle (HEV) which is often used in a SOC near 50%, it is difficult to detect the SOC fluctuation accurately because the SOC dependency of the cell voltage is small. Therefore, in case where a reason for causing the deviation is already known like a difference in consumption current, it is effective to prepare means for correcting the fluctuation.

Description will be given to each processing of the protection units 5A to 5D and the management unit 6 of this embodiment and the processing procedure of the protection unit including mutual communication among the protection units 5A to 5D and the management unit 6. In the meantime, the following processing procedures are executed according to programs stored in the microcontroller 20 of the protection units 5A to 5D and a microcontroller of the management unit 6.

(First Processing Procedure)

A first processing procedure will be described using FIG. 4. The management unit 6 is operated by an external power supply different from the assembled cell 1. When the management unit 6 is supplied with no power from the external power supply, the protection units 5A to 5D are down. When the management unit 6 is started by the external power supply, a startup instruction is dispatched to all the protection units 5A to 5D from the management unit 6 (step S100).

The protection units 5A to 5D are started by receiving a startup instruction, and the cell voltages of the battery modules 2A to 2D and the consumption currents I1 to I4 of the assembled cell 1 are measured by the voltage measuring unit 22 and the consumption current measuring unit 23 (steps S101 to S104). The management unit 6 transmits a data transmission request to the protection units 5A to 5D after a predetermined time elapses since the measurement is started (step S105). The data transmission request is transmitted every specified time, for example, every 100 msec. The protection units 5A to 5D, upon receiving the data transmission request, transmit measurement data after the communication state among the protection units 5A to 5D and the management unit 6 is stabilized after a startup, for example, after about five seconds elapse, as follows.

The protection unit 5D on the highest level transmits measurement data of the cell voltage of the battery module 2D and its own consumption current to the protection unit 5C just on a lower level through the communication unit 25 and the level shifter 26 as transmission data D4 (step S106).

The protection unit 5C combines measurement data D3 about the cell voltage of the battery module 2C and its own consumption current with the transmission data D4 from the protection unit 5A, and transmits the transmission data (D4+D3) to the protection unit 5B just on a lower level through the communication unit 25 and the level shifter 26 (step S107).

Similarly, the protection unit 5B combines measurement data D2 about the cell voltage of the battery module 2B and its own consumption current with the transmission data D4+D3 from the protection unit 5C, and transmits the transmission data (D4+D3+D2) to the protection unit 5A just on a lowest level through the communication unit 25 and the level shifter 26 (step S108).

Finally, the protection unit 5A combines measurement data D1 about the cell voltage of the battery module 2A and its own consumption current with the transmission data D4+D3+D2 from the protection unit 5B, and transmits the transmission data (D4+D3+D2+D1) to the management unit 6 through the communication unit 25 and the level shifter 26 (step S109).

The management unit 6 manages the state of charge of the entire assembled battery 1 using the measurement data of the cell voltages of the battery modules 2A to 2D in the transmission data D1+D2+D3+D4 from the protection unit 5A through the total management unit 32 and the communication unit 31 (step S110). The detailed description of the processing of step S110 is omitted because it is not within the spirit of the present invention.

Next, the management unit 6 compares the consumption currents I1 to I4 of the protection units 5A to 5D by means of the arithmetic operation unit 33 from the consumption current measurement data in the transmission data D1+D2+D3+D4 fetched in through the communication unit 31 and stores a maximum value in the memory unit 34 (step S111). Thereafter, the stored maximum value is transmitted to the protection units 5A to 5D through the communication unit 31 as a consumption current setting value I0 (step S112).

The protection units 5A to 5D store the consumption current setting value I0 fetched in through the level shifter 26 and the communication unit 25 in the arithmetic operation unit 24 and compare the consumption currents I1 to I4 measured by the consumption current measuring unit 23 every specified time, for example, every 100 msec (steps S113 to S116). The arithmetic operation unit 24 controls the discharging control unit 27 so as to discharge currents corresponding to I0-I1, I0-I2, I0-I3 and I0-I4 from the battery modules 2A to 2D based on this comparison result (steps S117 to S120). Consequently, all the consumption currents of the protection units 5A to 5D turn to I0 concurrently.

Figure 4:
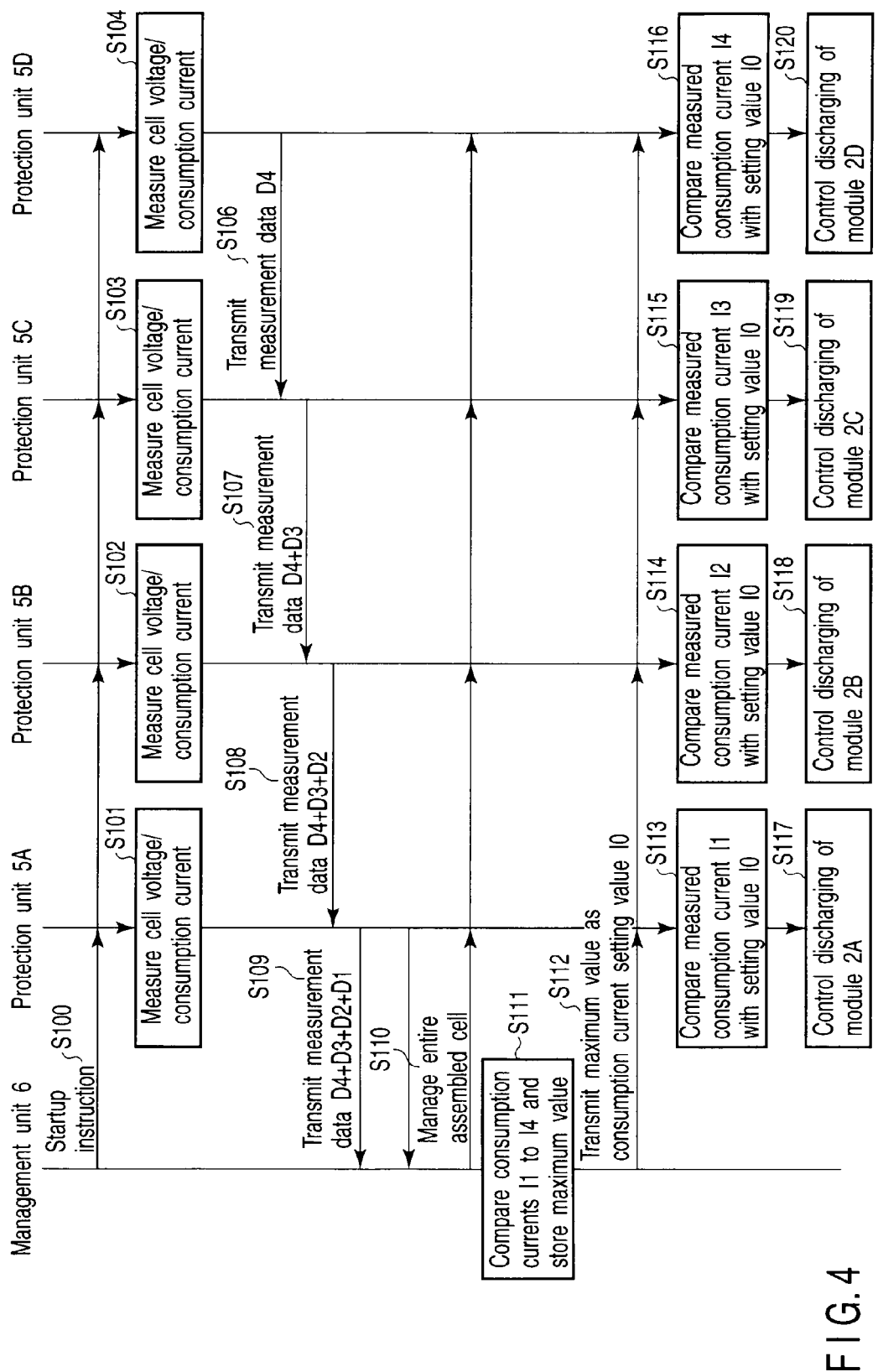
FIG. 4 is a flow chart showing a first processing procedure in the embodiment.

According to the first processing procedure shown in FIG. 4, the maximum value of the consumption currents I1 to I4 of the protection units 5A to 5D is obtained by the management unit 6. With this value set as the consumption current setting value I0, the protection units 5A to 5D control discharging. Thus, the consumption currents of the protection units 5A to 5D turn to I0 concurrently, so that the SOC fluctuation among the battery modules 2A to 2D due to a difference in consumption current can be suppressed.

(Second Processing Procedure)

Next, a second processing procedure will be described using FIG. 5. In the procedure shown in FIG. 5, the processing of steps S100 to S111 are the same as those in FIG. 4. The management unit 6, in step S111, compares the consumption currents I1 to I4 of the protection units 5A to 5D by means of the arithmetic operation unit 33 and stores a maximum value in the memory unit 34. Then, the management unit 6 transmits a difference between the stored maximum value and the respective consumption currents I1 to I4 to the protection units 5A to 5D through the communication unit 31 as discharging current setting values Is1 to Is4 (step S212).

The protection units 5A to 5D store the discharging current setting values Is1 to Is4 fetched in through the level shifter 26 and the communication unit 25 by means of the arithmetic operation unit 24 and controls the discharging control unit 27 so as to discharge currents corresponding to Is1 to Is4 from the battery modules 2A to 2D (steps S213 to S216). Consequently, all the consumption currents of the protection units 5A to 5D become equal to the initial maximum values of the consumption currents I1 to I4 concurrently.

Figure 5:
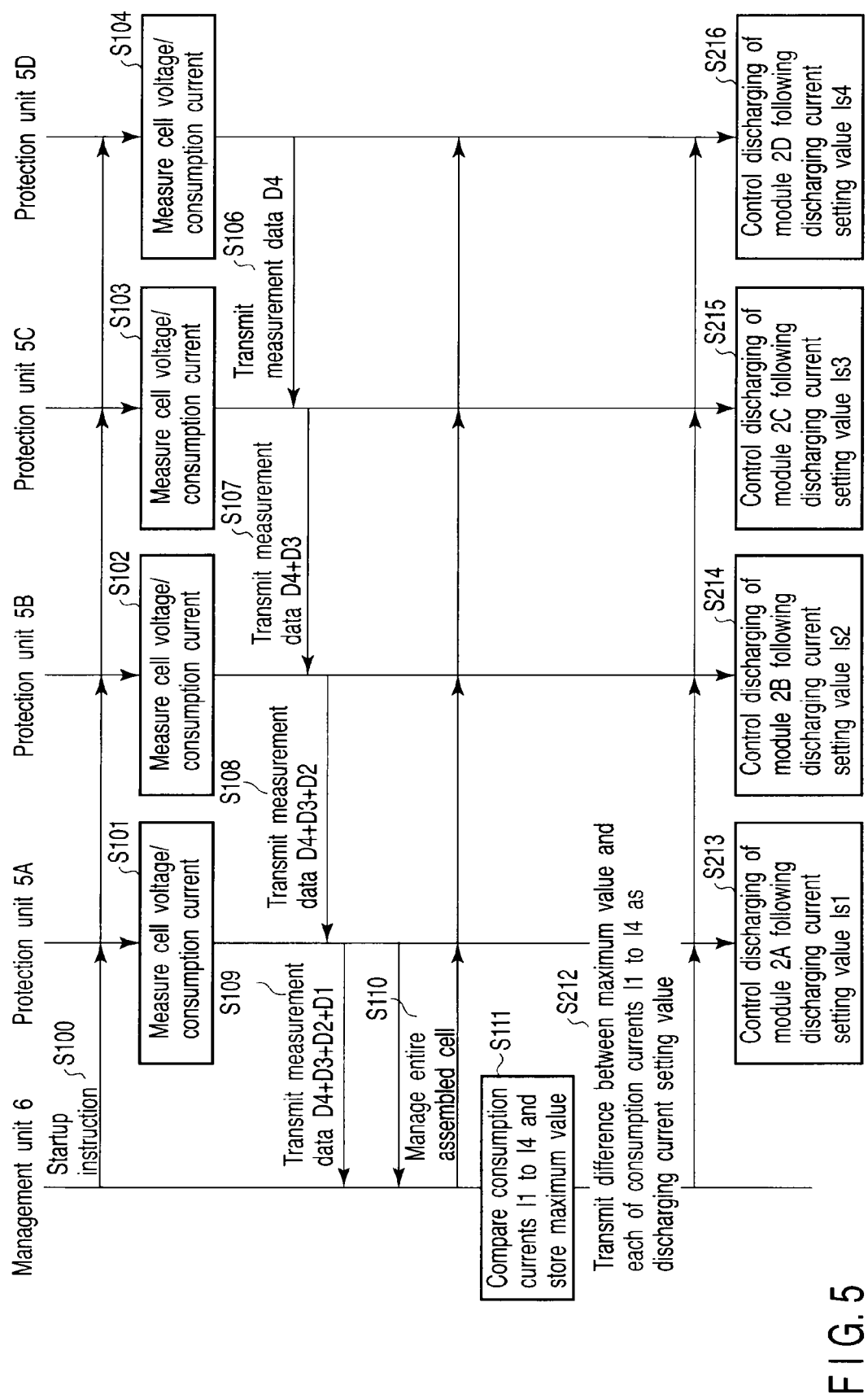
FIG. 5 is a flow chart showing a second processing procedure in the embodiment.

According to the second processing procedure shown in FIG. 5, the management unit 6 obtains differences between the consumption currents I1 to I4 of the protection units 5A to 5D and the maximum value as the discharging current setting values Is1 to Is4 and controls discharging of the protection units 5A to 5D by use of the obtained setting values. Thus, the consumption currents of the protection units 5A to 5D become equal to the maximum value concurrently as in the first processing procedure, which makes it possible to suppress the SOC fluctuation among the battery modules 2A to 2D due to a difference in consumption current.

(Third Processing Procedure)

Next, a third processing procedure will be described using FIG. 6. In the third processing procedure, a consumption electric quantity obtained by integrating consumption currents is used instead of the consumption current.

When the management unit 6 is started by an external power supply, the management unit 6 outputs a startup instruction to all the protection units 5A to 5D (step S300).

The protection units 5A to 5D are started upon receiving the startup instruction so as to measure the cell voltages of the battery modules 2A to 2D and consumption electric quantities Q1 to Q4 by means of the voltage measuring unit 22, the consumption current measuring unit 23 and the arithmetic operation unit 24 (steps S301 to S304). The consumption electric quantities Q1 to Q4 are obtained by integrating consumption currents measured by the consumption current measuring unit 23 by means of the arithmetic operation unit 24, every specified time, for example, every 100 msec.

The management unit 6 transmits a data transmission request to the protection units 5A to 5D after a specified time elapses since the measurement is started (step S305). The data transmission request is transmitted every specified time, for example, every 100 msec. The protection units 5A to 5D, upon receiving the data transmission request, transmit the measurement data after the communication state between the protection units 5A to 5D and the management unit 6 is stabilized about five seconds after the startup, as follows.

The protection unit 5D on the highest level transmits measurement data about the cell voltages of the battery module 2D and its own consumption electric quantity to the protection unit 5C just on a lower level through the communication unit 25 and the level shifter 26 as transmission data G4 (step S306).

The protection unit 5C combines measurement data G3 about the cell voltage of the battery module 2C and its own consumption electric quantity with the transmission data G4, and transmits the transmission data (G4+G3) to the protection unit 5B just on a lower level through the communication unit 25 and the level shifter 26 (step S307).

Similarly, the protection unit 5B combines measurement data G2 about the cell voltage of the battery module 2B and its own consumption electric quantity with the transmission data G4+G3 from the protection unit 5C, and transmits the transmission data (G4+G3+G2) to the protection unit 5A on the lowest level through the communication unit 25 and the level shifter 26 (step S308).

Finally, the protection unit 5A combines measurement data G1 about the cell voltage of the battery module 2A and its own consumption electric quantity with the transmission data G4+G3+G2 from the protection unit 5B, and transmits the transmission data (G4+G3+G2+G1) to the management unit 6 through the communication unit 25 and the level shifter 26 (step S309).

The management unit 6 manages the state of charge of the entire assembled battery 1 from the total management unit 32 through the communication unit 31 using the measurement data about the cell voltage of the battery modules 2A to 2D in the transmission data G1+G2+G3+G4 from the protection unit 5D (step S310).

Next, the management unit 6 compares the consumption electric quantities Q1 to Q4 of the protection units 5A to 5D by means of the arithmetic operation unit 33 from the consumption electric quantity measurement data in the transmission data G1+G2+G3+G4 fetched in through the communication unit 31 and stores a maximum value in the memory unit 34 every specified time, for example, every 100 msec (step S311). A difference between the stored maximum value and the respective consumption electric quantities Q1 to Q4 is transmitted to the protection units 5A to 5D through the communication unit 31 (step S312).

The protection units 5A to 5D store the discharging electric quantity setting values Qs1 to Qs4 fetched in through the level shifter 26 and the communication unit 25 by means of the arithmetic operation unit 24, and controls the discharging control unit 27 so as to discharge electric quantities corresponding to Qs1 to Qs4 from the battery modules 2A to 2D every specified time, for example, 100 msec (steps S313 to S316). Consequently, all the consumption electric quantities of the protection units 5A to 5D become equal to the initial maximum values of the consumption electric quantities Q1 to Q4.

Figure 6:
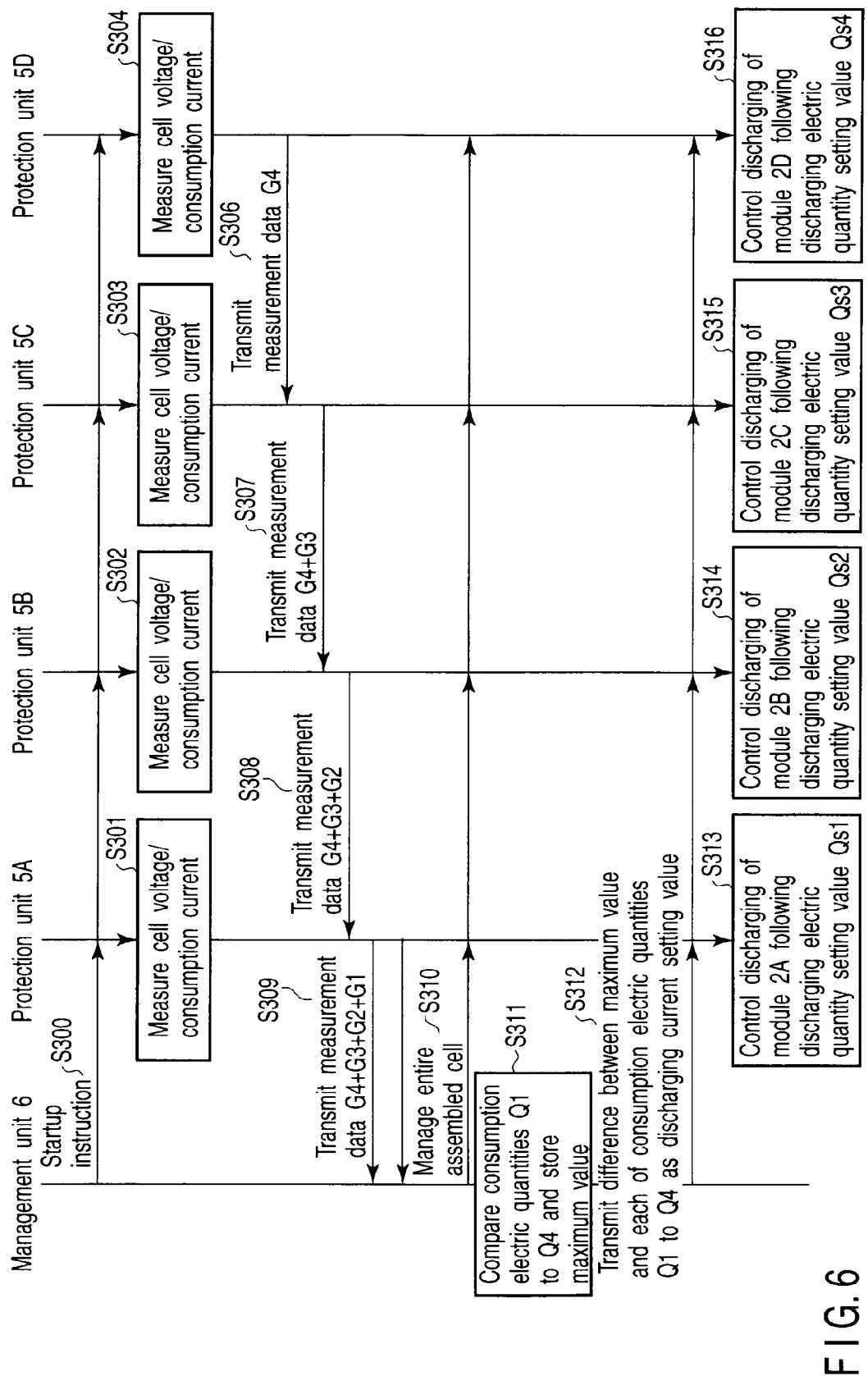
FIG. 6 is a flow chart showing a third processing procedure in the embodiment.

According to the third processing procedure shown in FIG. 6, the management unit 6 obtains differences between the consumption electric quantities Q1 to Q4 of the protection units 5A to 5D and the maximum value as the discharging electric quantity setting values Qs1 to Qs4 and controls discharging of the protection units 5A to 5D. Thus, the consumption electric quantities of the protection units 5A to 5D become equal to the maximum value concurrently, which makes it possible to suppress the SOC fluctuation among the battery modules 2A to 2D due to a difference in consumption electric quantity.

Next, the embodiments of the present invention will be described more specifically. Specific examples 1 to 3 described below correspond to the first processing procedure, the second processing procedure and the third processing procedure, respectively.

Specific Example 1

Five nonaqueous electrolyte secondary batteries having a discharging capacity of 3 Ah are connected in series to prepare a battery module. Four battery modules 2A to 2D thus prepared are connected in series as shown in FIG. 1 to manufacture an assembled battery 1. The protection device 4 described in FIGS. 1 to 3 is connected to the assembled battery 1 and discharging of the battery modules 2A to 2D is controlled with a maximum value of the consumption currents of the protection units 5A to 5D set as a consumption current setting value in accordance with the first processing procedure described in FIG. 4, thereby to correct the SOC fluctuation.

Specific Example 2

The protection unit 4 described in FIGS. 1 to 3 is connected to the same assembled battery 1 as described in Specific example 1, and discharging of the battery modules 2A to 2D is controlled with a difference between the consumption currents of the protection units 5A to 5D and the maximum value set as a discharging current setting value in accordance with the second processing procedure described in FIG. 5, thereby to correct the SOC fluctuation.

Specific Example 3

The protection unit 4 described in FIGS. 1 to 3 is connected to the same assembled battery 1 as described in Specific example 1, and discharging of the battery modules 5A to 5D is controlled with a difference between the consumption electric quantities of the protection units 5A to 5D and the maximum value set as a discharging electric quantity setting value in accordance with the second processing procedure described in FIG. 6, thereby to correct the SOC fluctuation.

Comparative Example

A protection device including neither measuring function nor discharging function for consumption current or consumption electric quantity is connected to the same assembled cell as described in Specific example 1. Then, a cycle test is carried out according to a charging/discharging method of charging the assembled cell under a constant voltage and current of 84V and 10 A for an hour under 45° C. and then discharging with constant voltage and constant current of 10 A until the minimum value of the cell voltage reaches 3.0 V. With the charge prohibiting voltage of the protection device set to 4.35 V and the discharge prohibiting voltage set to 2.5 V, the test is terminated if the cell voltage exceeds the range.

Table 1 shows a capacity retention after 2000 cycles and fluctuation in the cell voltage when charging is terminated (maximum value–minimum value) in Specific examples 1 to 3 and Comparative example described above.

TABLE 1

|  | Capacity retention after 2000 cycles | Fluctuation in cell voltage after 2000 cycles |
| --- | --- | --- |
| Specific example 1 | 89% | 40 mV |
| Specific example 2 | 91% | 35 mV |
| Specific example 3 | 92% | 37 mV |
| Comparative example | Stopped at 1250 cycles | 290 mV After 1250 cycles |

Specific examples 1 to 3 show that the fluctuation in the voltage among the cells is suppressed to a small level until the test of 2000 cycles is ended, indicating a high capacity maintenance ratio. In Comparative example, on the other hand, the fluctuation in the voltage among the cells is expanded, and a cell which exceeds the charge prohibiting voltage at 1250 cycles has appeared. Thus, the test is stopped halfway.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A protection device for an assembled cell including a plurality of battery modules connected in series, each of which includes a plurality of secondary batteries connected in series, the protection device comprising:
   a plurality of protection units provided corresponding one-to-one to a respective one of the battery modules, each of which is connected to a corresponding one of the battery modules through a power supply line including a current detection resistor so as to be fed with a supply current from the corresponding one of the battery modules, wherein each of the protection units is driven by the supply current; and
   a management unit connected to the protection units in common, wherein each protection unit includes:
      a voltage measurement unit configured to measure a voltage of the corresponding one of the battery modules;
      a consumption current measuring unit configured to measure the supply current passing through the detection resistor, wherein the supply current is measured as a consumption current consumed in the corresponding one of the battery modules to obtain measurement data;
      a communication unit which transmits the measurement data to the management unit and receives setting data from the management unit;
      a discharging unit which discharges the corresponding battery module to produce a discharge current flowing through the discharge unit; and a control unit configured to control the discharging unit to adjust the discharge current based on the measurement data and the setting data such that a sum total of the consumption current and the discharge current in the protection unit is substantially same as that in the other of the protection units.

2. The protection device according to claim 1, wherein the management unit includes:
an arithmetic operation unit configured to obtain a maximum value of respective consumption currents of the protection units based on the measurement data; and
a communication unit which receives the measurement data to provide the data to the arithmetic operation unit and transmits the maximum value to the protection unit as the setting data, and wherein
the control unit is configured to control the discharging unit so that a total of the consumption current and the discharging current is equal to the maximum value.

3. The protection device according to claim 1, wherein the management unit includes:
an arithmetic operation unit configured to obtain a difference between the maximum value of the respective consumption currents of the protection units and each of the consumption currents based on the measurement data; and
a communication unit which receives the measurement data to provide the data to the arithmetic operation unit and transmits the difference to the protection unit as the setting data, and
the control unit is configured to control the discharging unit so that the discharging current is equal to the difference.

4. A battery pack unit comprising:
an assembled cell including a plurality of battery modules connected in series, each of which includes a plurality of secondary batteries connected in series; and
a protection device according to claim 1.

5. A protection device for an assembled cell including a plurality of battery modules connected in series, each of which includes a plurality of secondary batteries connected in series, the protection device comprising:
a plurality of protection units provided corresponding one-to-one to a respective one of the battery modules, each of which is connected to a corresponding one of the battery modules through a power supply line including a current detection resistor so as to be fed with a supply current from the corresponding one of the battery modules, wherein each of the protection units is driven by the supply current; and
a management unit connected to the protection units in common, wherein each protection unit includes:
a voltage measurement unit configured to measure a voltage of the corresponding one of the battery modules;
a consumption electric quantity measuring unit configured to measure an electric quantity consumed in the corresponding one of the battery modules, wherein the consumed electric quantity is obtained as measurement data from the supply current passing through the detection resistor;
a communication unit which transmits the measurement data to the management unit and receives setting data from the management unit;
a discharging unit which discharges the corresponding battery module to produce a discharge current flowing through the discharge unit; and
a control unit configured to control the discharging unit to adjust an electric quantity to be discharged as the discharge current based on the measurement data and the setting data such that a sum total of the consumed electric quantity and the discharged electric quantity in the protection unit is substantially same as that in the other of the protection units.

6. The protection device according to claim 5, wherein the management unit includes:
an arithmetic operation unit configured to obtain a difference between the maximum value of the respective consumption electric quantities of the protection units and each of the consumption electric quantities based on the measurement data; and
a communication unit which receives the measurement data to provide the data to the arithmetic operation unit and transmits the difference to the protection unit as the setting data, and
the control unit is configured to control the discharging unit so that the discharging electric quantity is equal to the difference.

7. A battery pack unit comprising:
an assembled cell including a plurality of battery modules connected in series, each of which includes a plurality of secondary batteries connected in series; and
a protection device according to claim 5.

8. A battery pack unit comprising:
an assembled cell including a plurality of battery modules connected in series, each of which includes a plurality of secondary batteries connected in series; and
a plurality of protection units provided corresponding one-to-one to a respective one of the battery modules, each of which is connected to a corresponding one of the battery modules through a power supply line including a current detection resistor so as to be fed with a supply current from the corresponding one of the battery modules, wherein each of the protection units is driven by the supply current;
each protection unit includes:
a voltage measurement unit configured to measure a voltage of the corresponding one of the battery modules;
a consumption current measuring unit configured to measure the supply current passing through the detection resistor, wherein the supply current is measured as a consumption current consumed in the corresponding one of the battery modules;
a measuring unit configured to measure its own consumption current;
a discharging unit which discharges the corresponding battery module to produce a discharge current flowing through the discharge unit; and
a control unit configured to control the discharging unit to adjust the discharge current such that a sum total of the consumption current and the discharge current in the protection unit is substantially same as that in the other of the protection units.

9. The battery pack unit according to claim 8, wherein the control unit is configured to control the discharging unit so that a total of the consumption current and the discharging current is equal to the maximum value of the respective consumption currents of the protection units.

10. A battery pack unit comprising:
an assembled cell including a plurality of battery modules connected in series, each of which includes a plurality of secondary batteries connected in series; and
a plurality of protection units provided corresponding one-to-one to a respective one of the battery modules, each of which is connected to a corresponding one of the battery modules through a power supply line including a current detection resistor so as to be fed with a supply current from the corresponding one of the battery modules, wherein each of the protection units is driven by the supply current, each protection unit includes:

a voltage measurement unit configured to measure a voltage of the corresponding one of the battery modules;

a consumption electric quantity measuring unit configured to measure an electric quantity consumed in the corresponding one of the battery modules, wherein the consumed electric quantity is obtained as measurement data from the supply current passing through the detection resistor;

a discharging unit which discharges the corresponding battery module to produce a discharge current flowing through the discharging unit; and a control unit configured to control the discharging unit to adjust an electric quantity to be discharged as the discharge current such that a sum total of the consumed electric quantity and the discharged electric quantity in the protection unit is substantially same as that in the other of the protection units.

11. The battery pack unit according to claim 10, wherein the control unit is configured to control the discharging unit so that the discharging electric quantity is equal to a difference between the maximum value of the respective consumption electric quantities of the protection units and each of the respective consumption electric quantities.

* * * * *